United States Patent [19]
Facciani et al.

[11] Patent Number: 5,999,917
[45] Date of Patent: Dec. 7, 1999

[54] AUTOMATED SYSTEM FOR MANAGING A NON-QUALIFIED DEFERRED COMPENSATION PLAN

[75] Inventors: Andrea Marie Facciani; Gerald Facciani, both of Henderson, Nev.; Mark Gilje, Rocky River, Ohio; Jean-Philippe Khodara, Clayton, Mo.; Seth Koppes; Bill Meier, both of St. Louis, Mo.

[73] Assignee: Bancorp Services, L.L.C., St. Louis, Mo.

[21] Appl. No.: 08/705,883

[22] Filed: Aug. 29, 1996

Related U.S. Application Data
[60] Provisional application No. 60/003,442, Sep. 8, 1995.

[51] Int. Cl.$^6$ ........................................................ G06F 17/60
[52] U.S. Cl. .............................. 705/36; 705/35; 705/37; 705/4
[58] Field of Search ................... 705/4, 35, 36, 705/37, 38, 39, 26; 379/88.01

[56] References Cited

U.S. PATENT DOCUMENTS

| | | |
|---|---|---|
| 4,554,418 | 11/1985 | Toy ........................................ 379/88.01 |
| 4,566,066 | 1/1986 | Towers . |
| 4,642,768 | 2/1987 | Roberts . |
| 4,648,037 | 3/1987 | Valentino . |
| 4,674,044 | 6/1987 | Kalmus et al. . |
| 4,722,055 | 1/1988 | Roberts . |
| 4,750,121 | 6/1988 | Halley et al. . |
| 4,752,877 | 6/1988 | Roberts et al. . |
| 4,774,663 | 9/1988 | Musmanno et al. . |
| 4,799,156 | 1/1989 | Shavit et al. ............................. 705/26 |
| 4,839,804 | 6/1989 | Roberts et al. . |
| 4,876,648 | 10/1989 | Lloyd ....................................... 705/38 |
| 4,926,325 | 5/1990 | Benton et al. ........................... 705/39 |
| 4,933,842 | 6/1990 | Durbin et al. . |
| 4,942,616 | 7/1990 | Linstroth et al. . |
| 4,969,094 | 11/1990 | Halley et al. . |
| 5,101,353 | 3/1992 | Lupien et al. . |
| 5,126,936 | 6/1992 | Champion et al. ..................... 705/36 |
| 5,193,056 | 3/1993 | Boes . |
| 5,214,579 | 5/1993 | Wolfberg et al. ...................... 705/36 |
| 5,262,942 | 11/1993 | Earle . |
| 5,291,398 | 3/1994 | Hagan . |
| 5,414,838 | 5/1995 | Kolton et al. . |
| 5,752,236 | 5/1998 | Sexton et al. .......................... 705/4 |
| 5,806,042 | 9/1998 | Kelly et al. ........................... 705/35 |

OTHER PUBLICATIONS

DATAIR Defined Contribution/Defined Benefit Pension Administration System Manual, revision Apr. 1991, DB.
DATAIR Defined Contribution System User Manual, revision Mar. 1994, 6.1–1.

*Primary Examiner*—Emanuel Todd Voeltz
*Assistant Examiner*—John W. Hayes
*Attorney, Agent, or Firm*—Oblon, Spivak, McClelland, Maier & Neustadt, P.C.

[57] ABSTRACT

An automated system for managing the assets and liabilities of Non-Qualified Deferred Compensation (NQDC) plans. This system uses information from money managers, insurance and annuity carriers, plan sponsors and plan participants to track and report the assets and liabilities of NQDC plans on a daily basis. The system interfaces with fund managers and insurance and annuity carriers via modem links and with plan sponsors and participants via modem, fax or automated voice response units. The system calculates the value of the liabilities of the plan, the value of the assets of the plan and produces a report comparing the status of each on a daily basis. The system reviews the balance and levels that the sponsor has provided and determines whether changes in asset allocation are required. If changes are required, the system either provides the relevant information to the plan sponsor or directly to the asset manager, whether it be a mutual fund, insurance policy, or annuity that needs adjustment. The system also projects asset and liabilities into the future, further providing relevant information to the plan sponsor on a near real-time basis.

25 Claims, 11 Drawing Sheets

ALLOCATION SUMMARY ASSET GROUP

REPORT DATE: 8/17/95 2:10:03 PM

PROJECT NAME: CEMENT
SPONSOR NAME: XYZ MANUFACTURING   TOTAL LIABILITY: $11,097,301,80
PLAN GROUP NAME: GLOBAL WEALTH    TOTAL ASSET: $6,430,754.96

| | THE INCOME LINK | | | | | BENCHMARK 5% |
|---|---|---|---|---|---|---|
| | DATE | FUND NAME | ← LIABILITY → | | ← ASSET → | 106 |
| | 2/15/95 | PRIORITY BOND | $1,019,648.75 | 9.19% | | |
| | 2/15/95 | SUPER LEVERAGED | $955,274.50 | 8.61% | | |
| | 2/15/95 | INCOME & GROWTH | $1,317,666.56 | 11.87% | | |
| | 2/15/95 | BALANCED | $1,958,238.09 | 17.65% | | |
| | 2/15/95 | THE XYZ's FIXED INCOME | | | $1,923,315.03  30.05% | |
| | | 102 | $5,250,827.90 | 47.32% | $1,932,315.03  30.05% | → 17.27% |
| | | | | | BALANCE DIFFERENCE: | $3,318,512.87 |

| | THE LIQUID LINK | | | | | BENCHMARK 5% |
|---|---|---|---|---|---|---|
| | DATE | FUND NAME | ← LIABILITY → | | ← ASSET → | 106 |
| | 2/15/95 | CRITICAL MONEY MARKET | $1,545,746.80 | 13.93% | | |
| | 2/15/95 | SMALL GAINS | $1,455,964.06 | 13.12% | | |
| | 2/15/95 | XYZ's LIQUID | | | $1,283,124.95  19.95% | |
| | | 102 | $3,001,710.86 | 27.05% | $1,283,124.95  19.95% | → 7.10% |
| | | | | | BALANCE DIFFERENCE: | $1,718,586.91 |

| | THE STOCK FUND LINK | | | | | BENCHMARK 5% |
|---|---|---|---|---|---|---|
| | DATE | FUND NAME | ← LIABILITY → | | ← ASSET → | 106 |
| | 2/15/95 | MONSTER GROWTH | $878,480.78 | 7.92% | | |
| | 2/15/95 | GROWTH | $1,966,282.36 | 17.72% | | |
| | 2/15/95 | XYZ's SUPER GROWTH | | | $3,215,324.98  50.00% | |
| | | 102 | $2,844,763.14 | 25.63% | $3,215,324.98  50.00% | → 24.36% |
| | | | | | BALANCE DIFFERENCE: | $370,561.84 |

TOTALS: $11,097,301.90   $6,430,764.96

*FIG. 5*

DEFINED BENEFIT ALLOCATION SUMMARY

CURRENT CASH VALUE —140

$ 27,000

DEATH BENEFIT VALUE —142

$ 1,000,000

ESTIMATED LIABILITY —144

$ 45,000

BENCHMARK —146

AUTOMATED SYSTEM FOR MANAGING A NON-QUALIFIED DEFERRED COMPENSATION PLAN

This nonprovisional application is based on provisional application Ser. No. 60/003,442 filed on Sep. 8, 1995, the contents of which are incorporated herein by reference.

BACKGROUND OF THE INVENTION

1. Field of the Invention

This invention relates to an automated system for managing the assets and liabilities of Non-Qualified Deferred Compensation (NQDC) plans. The system interfaces with fund managers, insurance and annuity carriers and investment companies via modem links, with plan sponsors via fax, automated voice response units or through a Bulletin Board Service (BBS) program using a modem and with plan participants via fax, automated voice response units or through a BBS program using a modem. The system also reviews the balancing levels the sponsor has provided and determines whether changes in asset allocation are required.

2. Discussion of the Background

For many years the majority of employee benefits have been funded through the purchase of stocks, mutual funds, corporate owned life insurance (COLI) and annuities. The value of these assets was generally provided on a quarterly or monthly basis, and the liabilities of these benefit plans have generally been made available on an annual or perhaps quarterly basis. Therefore, plan sponsors have had to wait six to twelve months for information about the current funded status of a benefit plan. In addition, changes in the tax code in the past few years have reduced benefits to highly compensated employees (HCE), that is, persons earning over $60,000 to $70,000 per year, as defined in the tax code.

In response to this decrease in benefits, companies are installing plans commonly known as Non-Qualified Deferred Compensation (NQDC) plans which offset some of the benefits being lost. By deferring money tax-free from employees and investing the deferred money in Elective Deferral Defined Benefit plans or Elective Deferral Defined Contribution plans, the NQDC plan helps employees regain lost benefits. Elective Deferral Benefit plans offer various fixed returns on the deferred salary (or other benefits) of an employee depending upon the amount of money deferred and the number of years the money is deferred. A deferral of a $1,000 will be used as an example. The plan promises a 7.5% return each year until the normal retirement age of 65. If the deferral is made at 64, then the maturity value is $1,075, and the balance is paid out in a lump sum. If desired, a participant may choose to retire early, at any age after turning 55. If a participant retires before age 65, the account balance promised at 65 is reduced by 7% for each year prior to age 65. If a participant leaves the company prior to attaining age 55, the participant is given the initial deferral plus a 5% interest credit for each year since the initial deferral. If a participant dies prior to retiring, the beneficiary receives the promised age 65 balance immediately.

Elective Deferral Defined Contribution plans work like investing in mutual funds. For example, when a deferral of $1,000 is made, the participant elects to invest his money in at least one of several funds sponsored by his employer. (Employers may offer several funds, e.g., a Bond fund, a Balanced fund, a fund which tracks the "Standard & Poor's 500" average minus a fixed percentage, etc.). At the time of deferral, the employee selects the Bond fund trading at $100/unit. The $1,000 is converted into 10 units based on the value of the fund on the day that the deferral is made. As the plan sponsor hold the liability for the employee/plan participant, the unit value is then adjusted daily to reflect the net value of the fund, plus any dividends or accruals paid. The value of the employee's investment is equal to the number of units multiplied by the unit value of the fund on the day of conversion. Therefore, if the per unit value of the Bond fund was $175, then the investment would be worth $1,750. Plan participants may also transfer deferred payments between Defined Contribution and Defined Benefit plans and between funds in the Defined Contribution plans.

However, the funds are hypothetical funds used to determine the return due to an employee and need not correspond to any real fund directly. For example, when a deferral is made to the bond fund, the plan sponsor may not actually choose to buy any funds relating to bonds, the plan sponsor may actually buy stocks, insurance policies or other annuities instead. The plan sponsor only promises to provide the return of the hypothetical fund (e.g., the rate of increase of the "Standard and Poor's 500" minus some fixed percentage, the real value of the "Standard and Poor's 500" minus some fixed dollar amount, etc.). In fact, in cases where an asset group is overfunded (i.e., the assets exceed the liabilities), the excess assets may be transferred to other under-funded plans.

Furthermore, the regulations that apply to these plans restrict the manner in which these plans can be funded. In essence, companies may not directly fund the liabilities created by these plans, whereas the companies can directly fund their qualified plans. Instead of providing direct funding, a plan sponsor invests the unsecured deferrals in financial instruments of the plan sponsor's choosing (e.g., mutual funds, variable policy insurance policies, etc.) to cover the liability corresponding to each participant's investment choices. Because plan sponsors may not actually be investing in funds similar to the funds requested by the plan participants, plan sponsors need to have more immediate access to information regarding their plans. This enables the sponsor to cover its liabilities by reallocating its assets as participants reallocate their assets. The volume and timeliness of information is critical to a successful NQDC plan, and the traditional methods of providing information quarterly or annually have proven to be unacceptable. Since plan sponsors are receiving information and changes on a daily basis, the chances of a mismatch between the values of plan assets and liabilities have traditionally been high. Finally, participants were previously largely uninformed as to the value of their deferred money and benefits. Participants traditionally received a statement once a year, with no projections, and little information as to how the benefit was calculated. The dearth of information available to sponsors and participants has caused many companies to avoid the use of NQDC plans, thereby denying participants a chance at benefit restoration.

SUMMARY OF THE INVENTION

It is therefore an object of the present invention to overcome the disadvantages of the prior art systems.

It is another object of the present invention to provide a system capable of tracking and reporting assets and liabilities on a near real-time basis, a system that can project assets and liabilities into the future, and a system that makes the administration of NQDC plans simple, while keeping costs low for plan sponsors.

It is a further object of the invention to provide a system capable of tracking liabilities in both Defined Contribution and Defined Benefit plans.

It is a further object of the present invention to provide plan participants with timely access to plan information using modem, fax or automated voice response units.

It is yet another object of the present invention to provide plan sponsors with timely access to liability information by determining plan participants positions in the Defined Contribution and Defined Benefit plans.

It is yet another object of the present invention to provide plan sponsors with a means for calculating the liabilities of a Defined Contribution plan by contacting an external data provider by phone to determine the unit value of funds offered by the plan.

It is an additional object of the present invention to provide a means for the plan sponsors to determine plan assets by contacting external data sources to receive the values of insurance policies and financial instruments held by the plan sponsor.

It is an additional object of the present invention to provide a means for associating liabilities with assets and measuring an absolute dollar or percentage difference between the liabilities and their associated assets.

It is a further object of the present invention to provide a means of reporting to a plan sponsor that the assets and liabilities of a plan have values outside of a specified ratio or differential.

It is a further object of the present invention to provide a means of reconciling charges reported by an asset manager with internally calculated values for what the changes should be based on known transaction and management costs.

The above objects and other objects are achieved according to the present invention, by providing a computer system capable of tracking assets and liabilities for a NQDC plan stored in the computer system. The computer system determines the value of assets in the plan by calling an information warehouse (e.g., the Dow Jones Bulletin Board Service, insurance companies, investment companies, etc.) and requesting the current unit value of each asset held by the plan sponsor. The number of units of each asset times the value of each asset determines the current total asset value of the fund.

On the other hand, the total liabilities are calculated so they can be compared against the total assets. The total liability of a Defined Contribution plan is determined by multiplying the number of fund units held by plan participants in each fund by the unit values for the funds for that particular day. The number of fund units a participant buys when a user defers money is calculated in the computer system by converting the dollar amount of a user transaction (deferral, transfer among funds, realignment of fund allocation) into a number of fund units that the user can purchase for that amount on the day the transaction is made.

The current system draws on the teachings of actuarial statistics to estimate/predict statistically what assets are needed to cover incurred liabilities. Additional books covering the subject of actuarial statistics/mathematics are *Actuarial mathematics* by Newton L. Bowers, Jr., et al., *Society of Actuaries' textbook on life contingencies* by Chester Wallace Jordan, Jr. and *The theory of interest* and *Fundamentals of numerical analysis*, both by S. G. Kellison; the subject matter of the books is incorporated herein by reference.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a report showing a hypothetical set of assets and liabilities contained within a Deferral Defined Contribution plan and FIG. 5 also shows the tolerance parameters defined to indicate now closely the assets should correspond to the liabilities;

FIG. 8 is a report showing a hypothetical set of assets and liabilities contained within a Deferral Defined Benefit Plan;

DETAILED DESCRIPTION OF THE PREFERRED EMBODIMENTS

Figure 1:
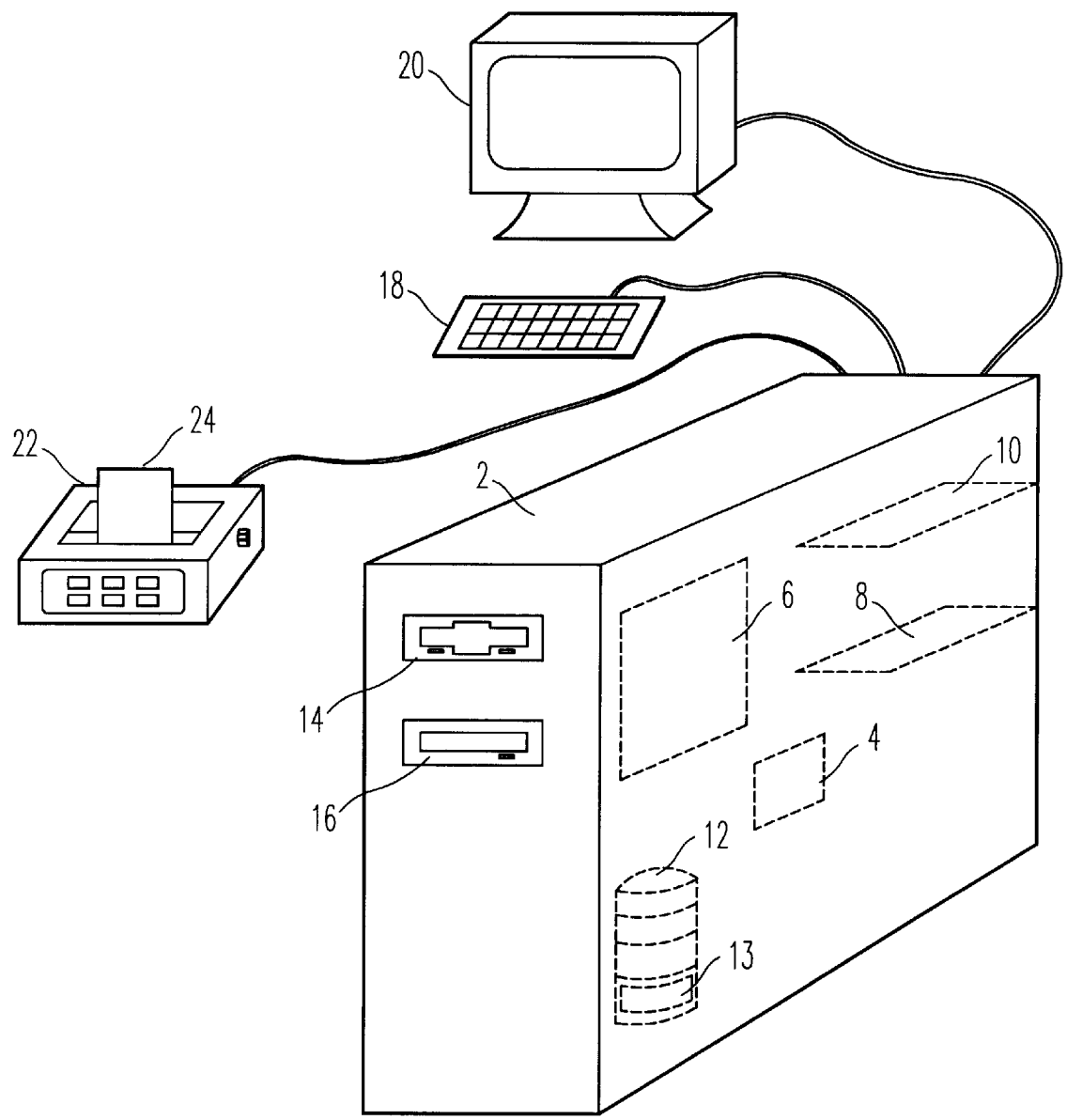
FIG. 1 is a layout diagram of the system according to an embodiment of this invention.

Referring now to the drawings, wherein like reference numerals designate identical or corresponding parts throughout the several views, FIG. 1 is a view showing an embodiment of the system of the present invention. Within a computer 2, there are provided: a central processing unit for a memory subsystem 6, a fax/modem card 8, an automated voice response unit 10, a digital storage means 12, a low density removable medium storage means (e.g., a floppy disk drive) 14 and a high density removable medium storage means (e.g., compact disc drive or tape drive) 16. Furthermore, keyboard 18 and monitor 20 are connected to the computer system 2 for inputting and outputting data, respectively. An additional printer 22 for printing reports 24 is also provided.

The heart of the computer system 2 is the central processing unit 4 which can comprise any one of the commercially available central processing units (e.g., Intel 80x86, Motorola 680x0, Power PC, etc.) to direct and coordinate the activities of the other components of the present system. The memory subsystem 6 comprises a combination of read only memory (ROM) and random access memory (RAM), and the memory's subsystem 6 stores commands to be executed by the central processing unit 4. Together the central processing unit 4 and memory subsystem 6 control the other devices of the system. A fax/modem, connects to a telephone line (now shown) to transfer information between the computer system and fund managers, insurance and annuity carriers, investment companies, plan sponsors and plan participants. The fax half of the fax/modem 8 additionally is used to send confirmations to plan participants when they make trades between funds or between the Defined Contribution and Defined Benefit plans. One such fax/modem that is commercially available is the Practical Peripherals 144FMT, whose technical manual and operations manual are incorporated herein by reference. The modem half of the fax/modem 8 sends and receives information from plan sponsors and participants' remote computers, by using an installed bulletin board service (BBS) program which runs on the computer system 2. The BBS program in an alternate embodiment is run on a second computer system 2 and exchanges information with the first computer system 2. In another alternate embodiment (not shown), the fax and modem are separate components of the computer system 2. In yet another embodiment, multiple fax/modems, fax-boards or modems are installed in the computer system 2 to provide connections to multiple plan participants or sponsors simultaneously.

The modem is additionally used to contact outside information providers and asset managers. In another embodiment of the present invention, the modem used to receive census data to update internal life expectancy and early retirement information that is used to calculate liabilities. Such information can be obtained from the U.S. Census Bureau.

The automated voice response unit (VRU) 10 likewise is connected to a telephone line (not shown) and is controlled by voice response unit control software. In an alternate embodiment, the VRU control software runs on a different computer and either shares information with the main computer system 2 or receives a snapshot of the data to use when providing information to plan participants and sponsors. Edify Corporation commercially provides such software under the tradename Electronic Workforce. Electronic Workforce runs on IBM compatible machines running OS/2 2.1 or later. Electronic Workforce also interacts with various databases on the digital storage means 12. In an alternate embodiment, a combination of fax/modem 8 and an automated response unit 10 are used to provide the requested information. By using the automated response unit 10, a plan sponsor or participant requests information from the computer system 2. The requested information then is faxed using the fax/modem 8 to a number entered into the automated response unit 10 when the information was requested. This enables the delivery of reports on a near real-time basis.

Digital storage means 12 also is used to store both programs (e.g., operating systems and user applications) and a database 13. The programs are loaded from the digital storage means 12 into the memory subsystem 6, and they are then executed by the CPU 4. The database 13 of information describes the assets and liabilities managed by the present invention. Currently available commercial databases such as DB2/2 for OS/2, Microsoft Access for Windows and Oracle's SQL server are suitable for storing asset and liability information. Their corresponding Users Manuals are incorporated herein by reference. Additional programs and information can be written to the digital storage means 12 having been read from the low density removable medium storage means 14 and high density removable medium storage means (e.g., compact-disc) 16 or having been transmitted the computer system 2 via the fax/modem 8 or the automatic voice response unit 10. The present invention further includes a computer readable media (e.g., high density removable storage means 16) for controlling a computer to manage a non-qualified deferred compensation plan. As is well known, a keyboard 18 additionally is used for entering data into the computer systems, and a computer monitor 20 is used to display both graphical and textual information from the computer systems. A printer 22 prints reports 24 showing plan sponsors and participants their present positions, including any positions of plan sponsors which vary outside of predetermined ranges.

Figure 2A:
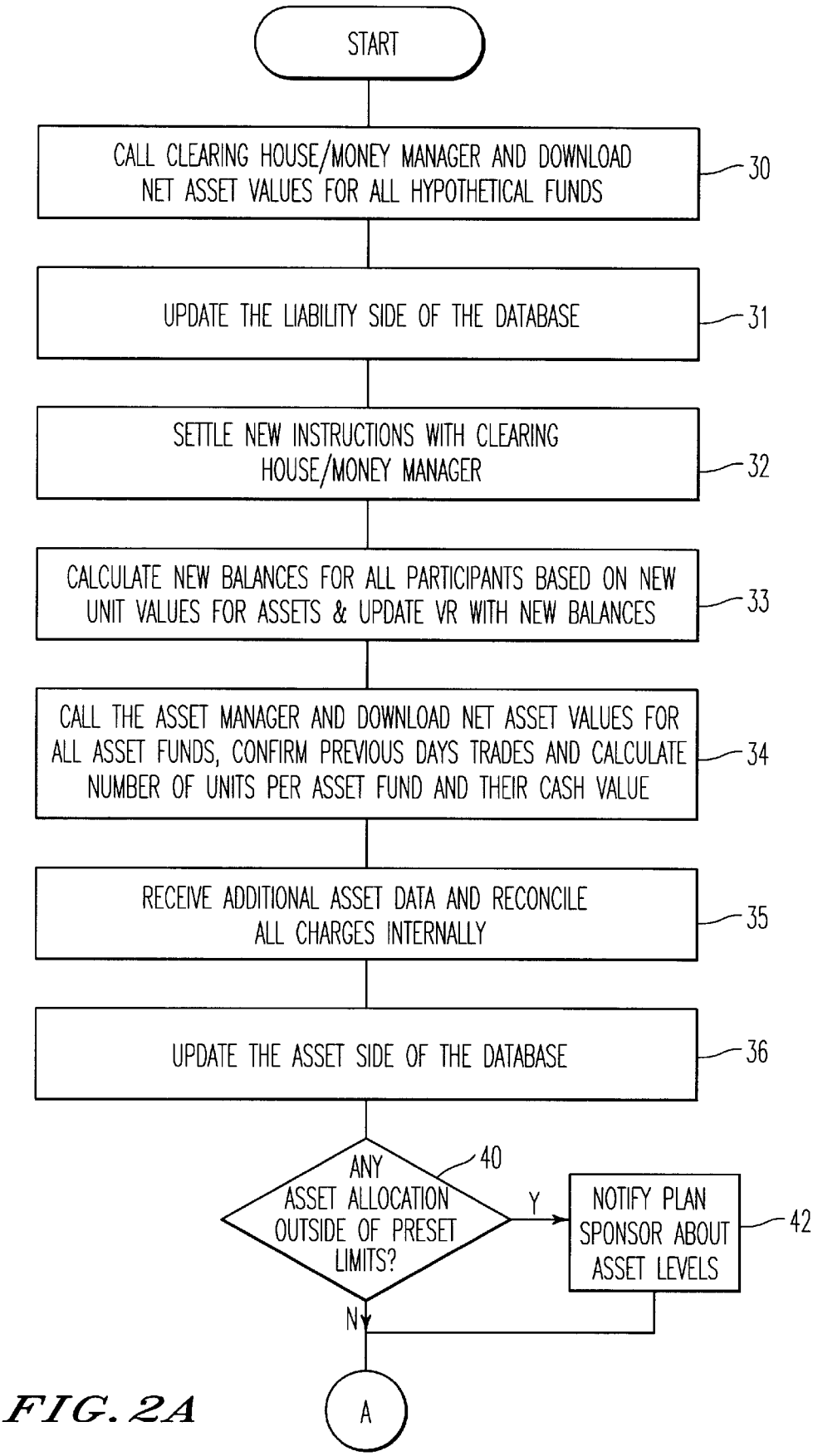
FIGS. 2A and 2B are flowcharts of the daily operation of the system of the present invention.
Figure 2B:
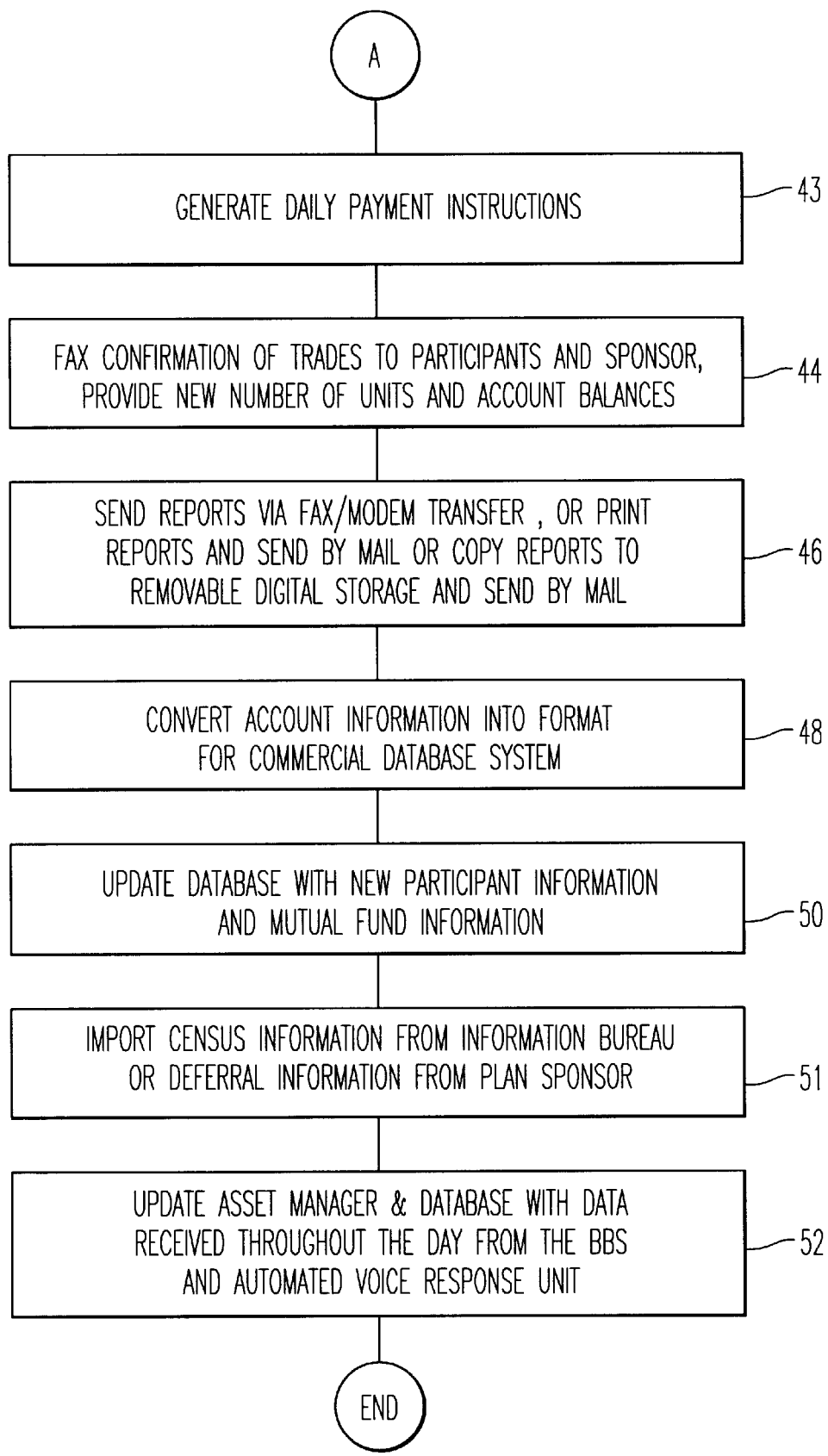

Moving now to FIGS. 2A and 2B, the operation of the system will be described in terms of a daily schedule. In the morning, the computer system 2 performs step 30 and uses the fax/modem 8 to call an information provider (e.g., the Dow Jones Bulletin Board Service, an investment clearinghouse, a money manager, etc.) and downloads the previous night's net asset values for all hypothetical funds provided by the plan sponsor in the Defined Contribution plan (i.e., "Standard & Poor's 500", Stock and Bonds). In step 31, the downloaded information is used to update the liability side of the database stored on the digital storage medium 12. In step 32, outstanding plan sponsor buy and sell instructions are settled with the appropriate clearing houses by sending requests made by the plan sponsor from the computer system 2 to the clearing houses. These requests keep the plan sponsor's asset allocation matched to the participants' liability allocations. Steps 30 and 32 will be shown in FIGS. 4 and 7 in more detail. In step 33, new balances are calculated for each participant based on the per unit values downloaded from the information providers. These balances are provided to the VRU control software to enable the VRU to provide balance information to plan participants and sponsors. Although the data is a snap-shot of a participant's position, the snap-shot can be updated as frequently during the day as desired in order to reflect changes caused by trades, etc. The computer system, in step 34, then calls the Asset Manager and downloads the previous night's net asset values for all asset funds, confirms the previous day's trades and calculates a number of units per asset fund and their cash values. In step 35; additional data on charges incurred by the plan sponsor to cover management of funds and trade costs are also downloaded, and the downloaded values are reconciled with internal calculations of what the changes should be. The computer system 2 then updates the asset side of the database 13 for the Defined Contribution and Define Asset plans, in step 36. Steps 34 and 36 are shown in more detail in FIGS. 3 and 6 for the Defined Contribution and Defined Benefit plans, respectively. In step 40, the assets and corresponding liabilities are compared with preset limits to determine if the asset allocation indicates that the differences are beyond preset limits. If any allocations are outside of their limits, the plan sponsor is notified in step 42 about the current asset levels. Whether the plan sponsor is notified or not, the system continues with normal processing in step 43. Step 43 generates any daily payment instructions which would enable a plan participant to receive benefits from either the Defined Contribution or Defined Benefit plans. To keep plan participants informed about their investments, in step 44 fax confirmation of trades are sent to participants; the faxed information provides the participants' new numbers of units and account balances. To keep plan sponsors informed about the status of the offered plans, fax confirmations of plan participant trades are also sent to the plan sponsor in step 44. Electronic reports showing asset and liabilities for each asset group are sent monthly via fax/modem transfer to plan sponsors that can receive such information, and printed reports and copies of reports on removable digital storage are sent by mail in step 46 to other plan sponsors. In step 48, at the end of a day's transactions, the account information is converted into a format for a commercial database system, and the database is updated with new participant information and mutual fund information in step 50. To help with calculating liability in the future and to calculate expected returns, census and other information can be retrieved from remote sources in step 51 and stored into the database 13. In addition, the asset manager and database 13 are updated in step 52 with data received throughout the day from the Bulletin Board Service and the automated voice response unit 10.

Figure 3:
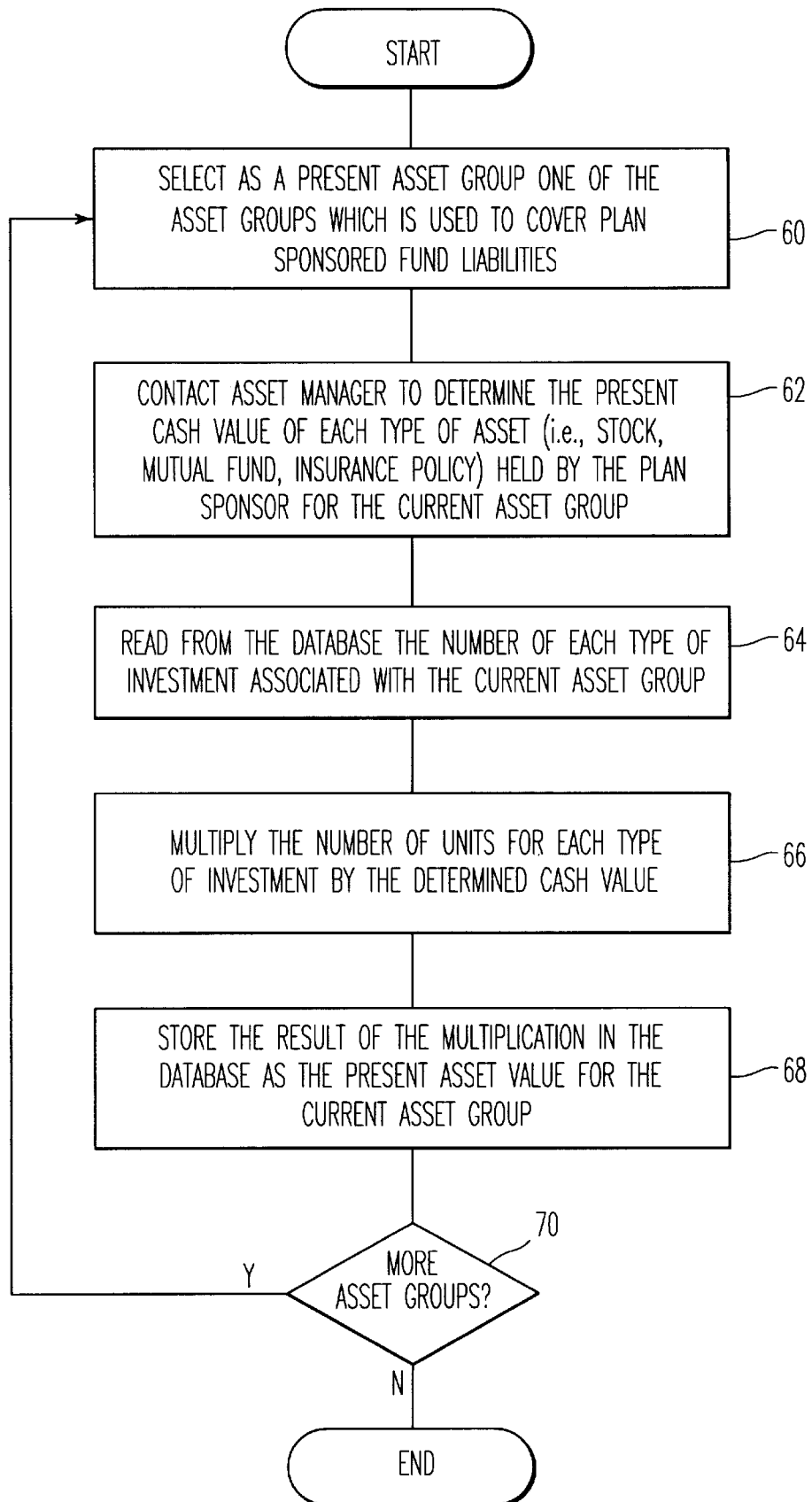
FIG. 3 is a flowchart showing how current assets are updated for Defined Contribution plans.

The flowchart of FIG. 3 depicts one implementation of how the current assets are calculated in the computer system of the present invention for Defined Contribution plans. A first asset group is read in step 60 from a list of asset groups stored in a database 13 on the digital storage means 12. The asset manager is then contacted in step 62 to determine the present cash value of the assets (i.e., stocks, mutual funds, annuities) held by the plan sponsor which are linked to the first asset group. In step 64, the number of each type of investment is also read from the database 13. The number of units of each asset is multiplied by the corresponding unit value to create a value of the assets held. In the next step, step 68, the asset value stored in the database 13 is updated with the calculated value so that it can be compared with the corresponding liabilities of the asset group, as was explained for step 40. This process of updating and storing asset values for an asset group is performed for each uncalculated asset group if step 70 determines that some asset groups have not been updated.

Figure 4:
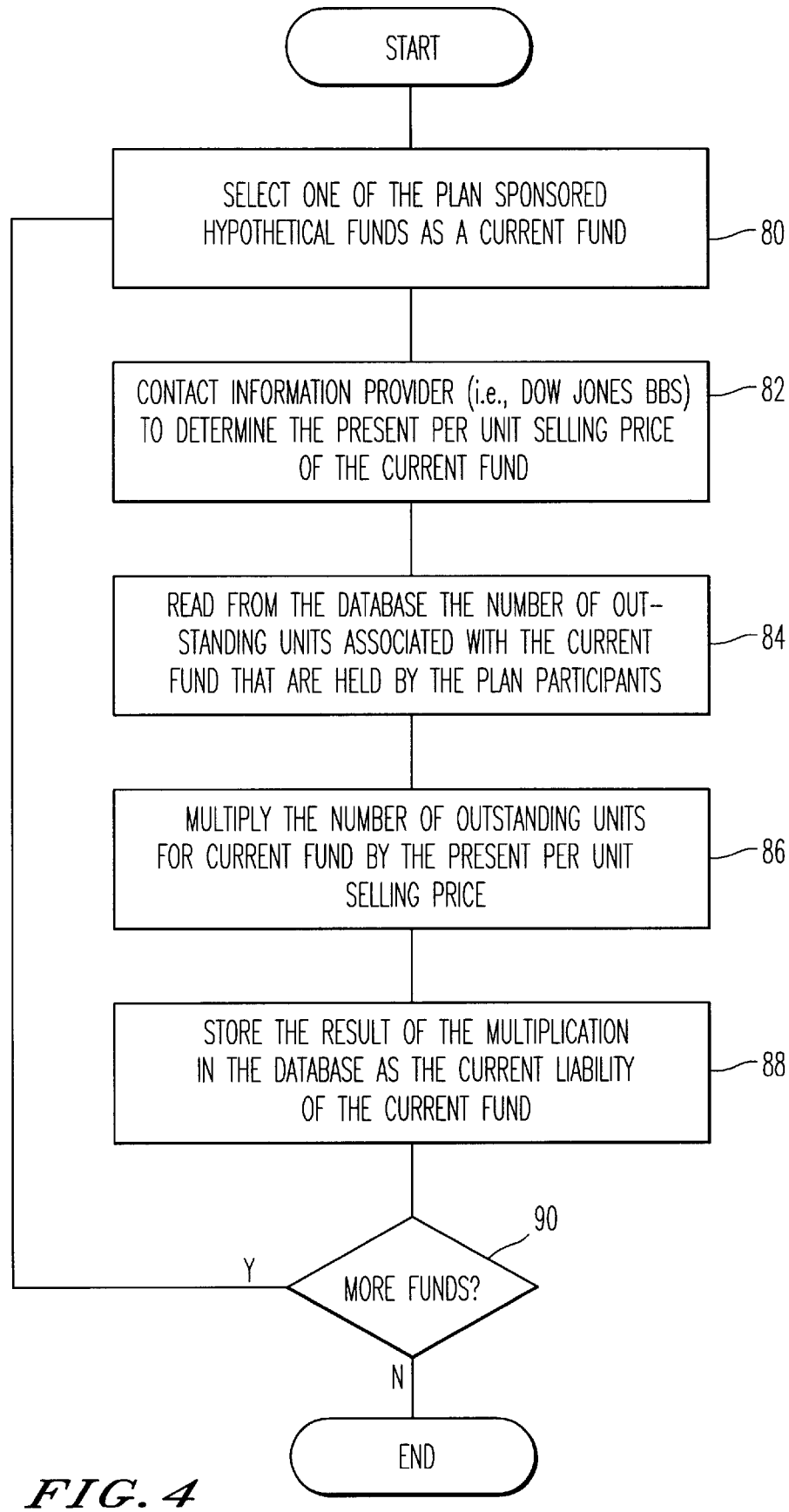
FIG. 4 is a flowchart showing how liabilities are updated for an Elective Deferral Defined Contribution plan.

The flowchart of FIG. 4 depicts a method of calculating the liability of deferrals for each hypothetical fund in an asset group for Defined Contribution plan as was performed in steps 30 and 31. In step 80, the computer system selects, from the database 13 stored on the digital storage means 12, one of the hypothetical funds being offered by the plan sponsor as a current fund. In step 82, the computer system uses the fax/modem to contact an information service provider to determine the current selling price of the current hypothetical fund offered by the plan sponsor. In step 84, the number of outstanding units for the current hypothetical fund is read from the database 13. This number of units is multiplied in step 86 by the current per unit selling price of the current hypothetical units to determine the present liability of the Defined Contribution plan for the current fund. Step 88 stores the calculated value in the database 13 to be compared in step 40 with a corresponding asset value. Step 90 continues the updating process again at step 80 if there are more funds which have not been updated. When all funds have been updated, step 90 ends the updating process.

The report of FIG. 5 is an Allocation Summary for a Defined Contribution plan showing how three sets of assets in an asset group are linked to their corresponding funds. As an example of a fund link 100, the Income Link has an asset 102 indicated by the name "the XYZ's fixed income" with a current value of $1,932,315.03, which is 30.05% of the asset group's total assets. This asset is used to secure a plan sponsor's position for four funds 104: Priority Bond, Super Leveraged, Income & Growth and Balanced, totaling $5,250,827.90, which constitutes 47.32% of the liability for the whole asset group. The benchmark 106 for the fund link 100 is shown as 5%; therefore, a report will be generated and sent to the plan sponsor to indicate that the current liability of 47.32% of the fund link is not within 5% of the current asset allocation of 30.05% of the fund for the defined asset group. In this way, the dollar value of an asset for a fund link need not match the dollar value used to secure the liabilities of a fund link. As long as the percentage allocation of total assets for a link match the percentage allocation of total liabilities for the link, the link is considered to be within the benchmark. In this way, if the liability of an asset link of an asset group grows, the corresponding assets of the asset group can grow proportionally.

Figure 6:
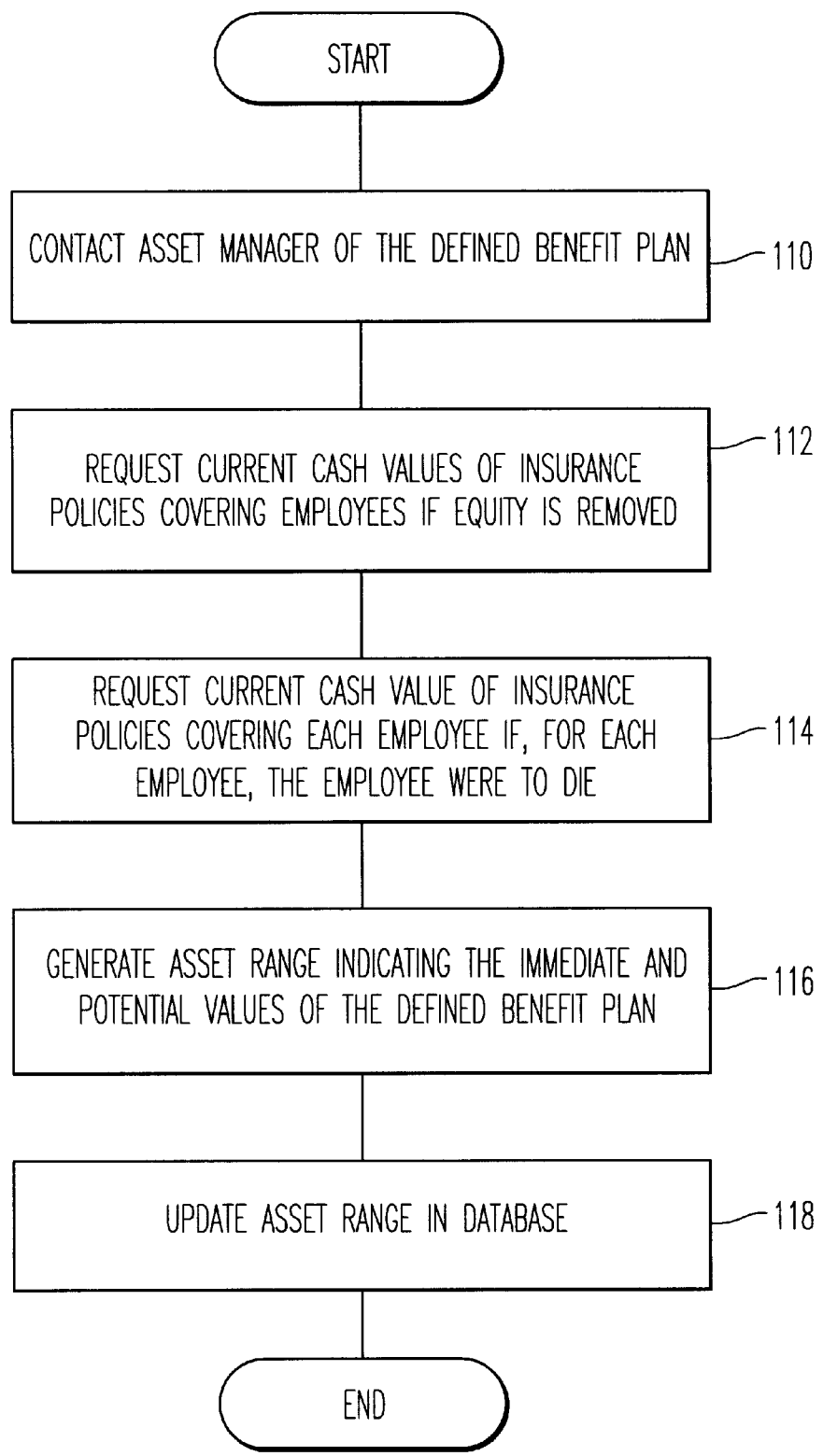
FIG. 6 is a flowchart showing how current assets are updated for a Defined Benefit plan.

The flowchart of FIG. 6 shows how the insurance policy asset values of an Elective Deferral Defined Benefit plan are updated in the present system. The computer contacts the asset manager of the Defined Benefit plan in step 110, and in step 112 requests the current cash values of insurance policies covering employees if the equity were to be removed on the current day. In step 114, the computer further requests the current cash value of each policy to determine the value of the policy if each employee were to die. Using the information of steps 112 and 114, the computer system generates an asset range in step 116 which indicates the immediate and potential values of the Defined Benefit plan based on the outstanding insurance policies held by the plan sponsors. The asset range is then stored in the database 13 so the asset value can be compared with the Defined Benefit Liability to determine if there is a mismatch in fund allocation.

Figure 7:
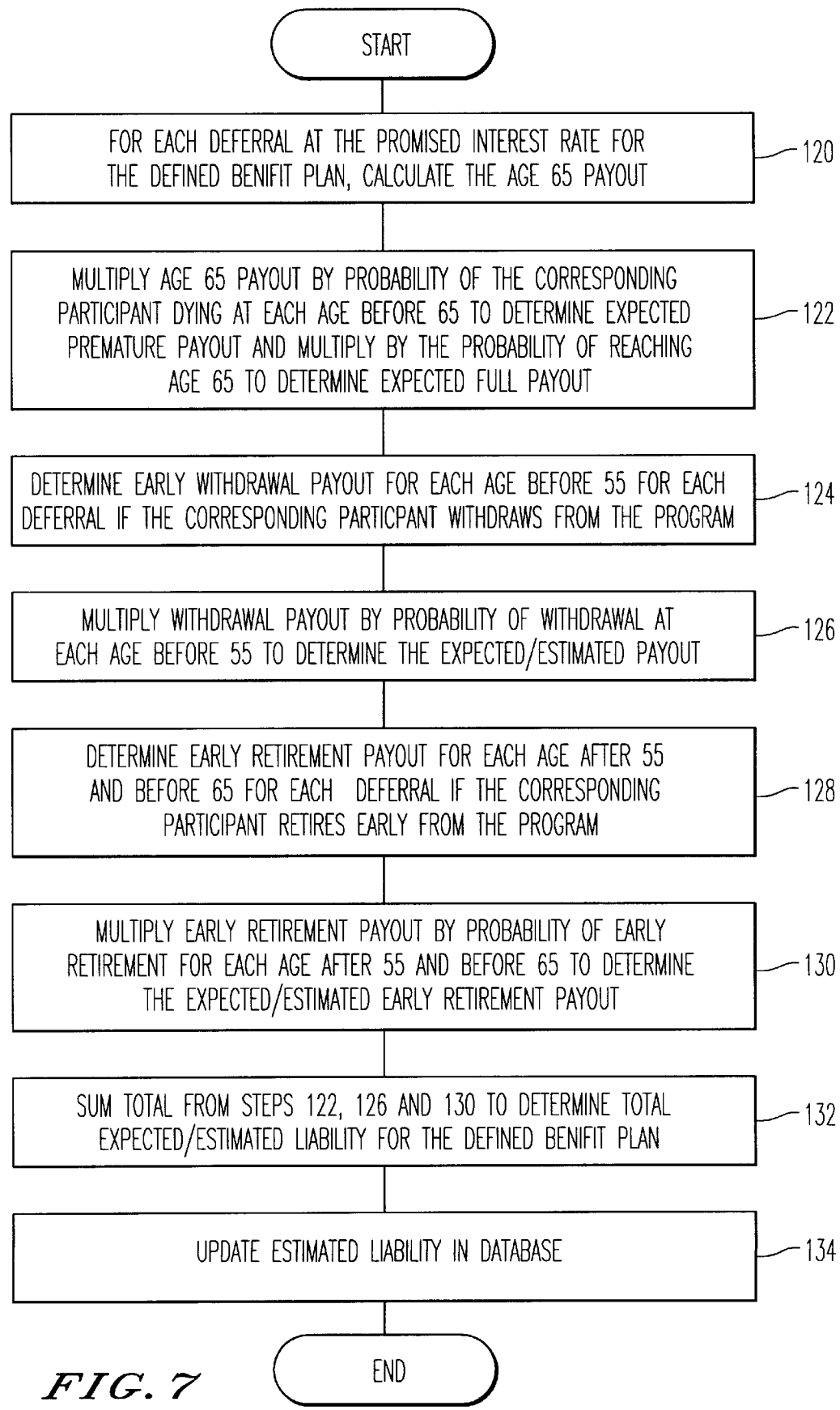
FIG. 7 is a flowchart showing how estimated liabilities are updated for an Elective Deferral Benefit plan.

The flowchart of FIG. 7 depicts how estimated liabilities are calculated for an Elective Deferral Defined Benefit plan as was performed in steps 30 and 31. The liability is calculated as an estimated liability based on the probabilities of dying, withdrawing or retiring at each age up to age 65. In the first step of computing an estimated liability, step 120, the computer system determines the payout for each deferral for a given interest rate if the corresponding participant removes his money at age 65. The payout at age 65 is also the payout should the plan participant prematurely die before removing his money. In step 122, the age 65 payout is multiplied by the probability of the corresponding participant reaching age 65, thus calculating an expected full payout. Likewise, the age 65 payout is multiplied by the probability of the corresponding participant dying at each age before 65 to determine an expected premature payout. In step 124, the computer system determines the payout for each age before 55 for each deferral if the corresponding participant withdraws from the program. By multiplying in step 126 the withdrawal payout by the probability of withdrawal at each age before age 55, an early withdrawal payout is calculated. Furthermore, in step 128 an early retirement payout is calculated for each age after 55 and before 65 of a corresponding participant for each deferral. The early retirement payout is multiplied in step 130 by the probability of early retirement for each age after 55 and before 65 to determine the expected/estimated early retirement payout. In step 132, all expected payouts are summed to determine a total expected/estimated liability for the Defined Benefit plan. This value is updated in the database 13 in step 134.

The report of FIG. 8 shows a current cash value of a Defined Benefit plan as calculated in FIGS. 6 and 7. The current cash value 140 is determined in FIG. 6, step 112, whereas the death benefit value is calculated in FIG. 6, step 114. The estimated liability 144 is calculated according to the method of FIG. 7, with the final result being stored in step 134 of FIG. 7. In addition, because the benchmark 146 for the Defined Benefit plan is indicated to be $10,000, the computer system, when implementing the process of FIG. 2A, would determine that an asset allocation is outside of preset limits in step 40 and notify the plan sponsor about the asset level using step 42.

Figure 9:
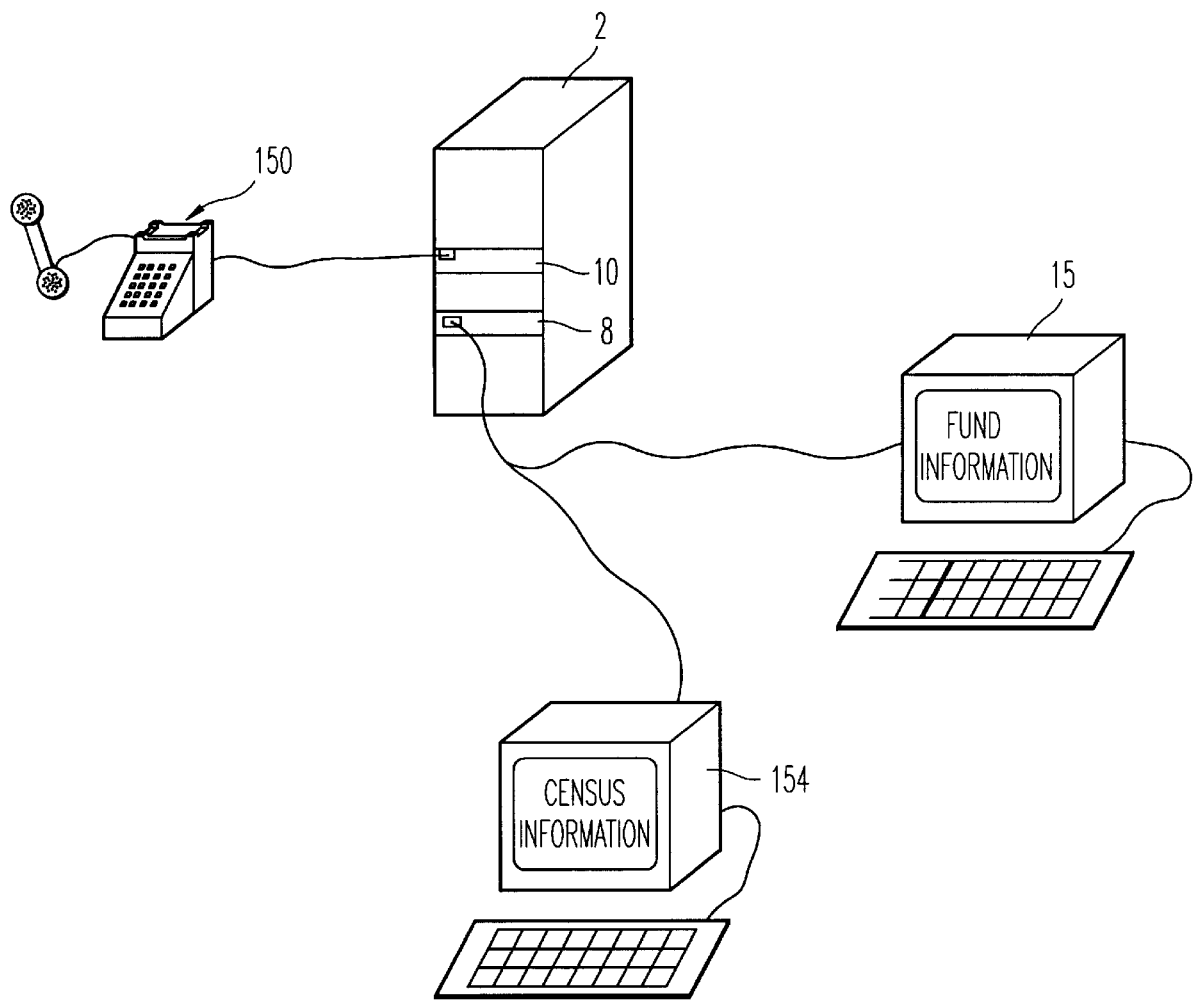
FIG. 9 is a schematic showing devices for remotely receiving information from the present invention by using a telephone as an input/output device or by using a terminal/computer as the interface to the computer system across a telephone line.
Figure 10:
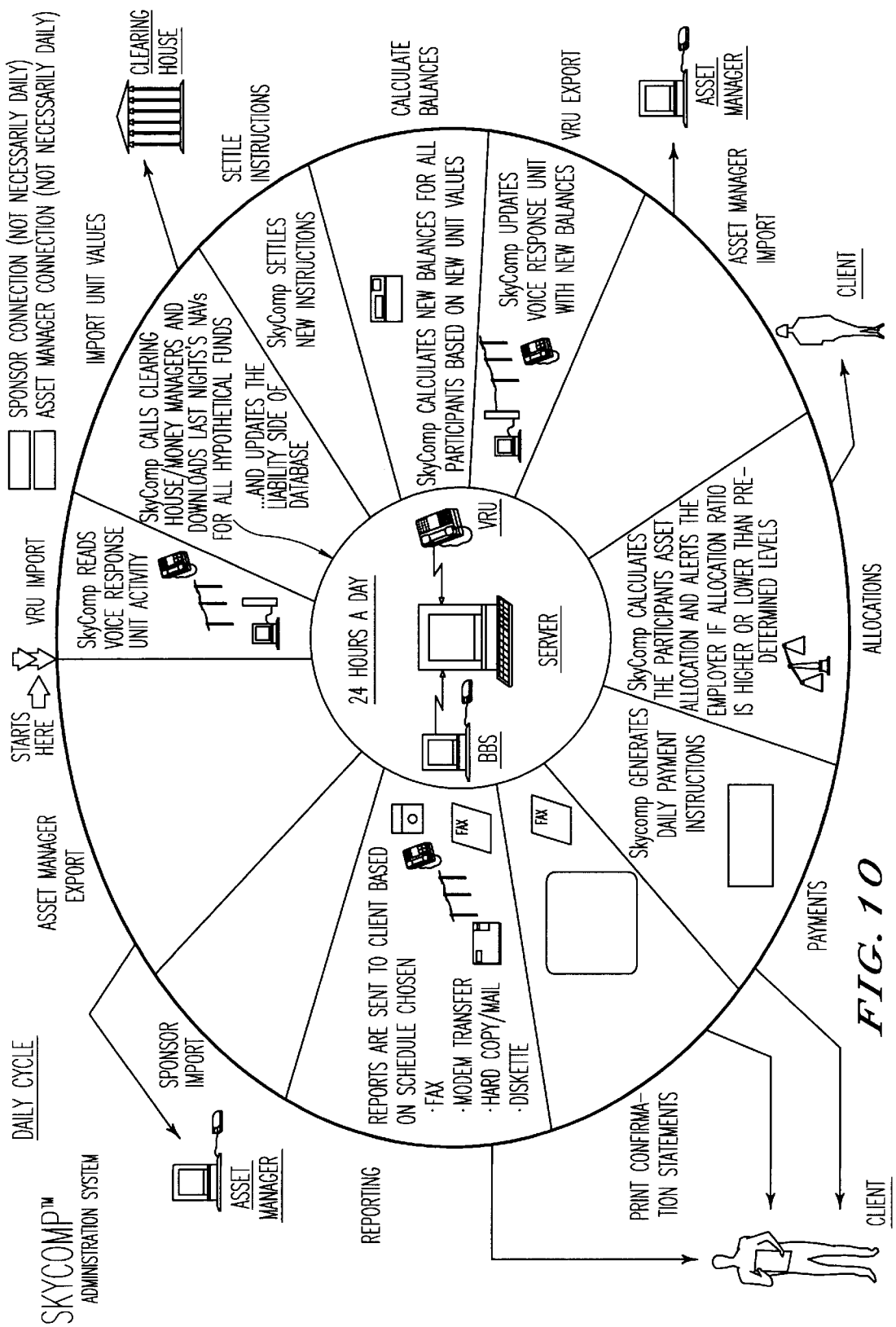
FIG. 10 is a graphic illustration of the processing cycle used by the present application.

As shown in FIG. 9, deferrals and changes to a plan participant's funds can be made remotely using a telephone 150 or a computer terminal 152. Likewise, the plan sponsor can get information about the status of asset groups using the telephone 150 or the computer terminal 152. When connecting to the computer system 2 using the telephone 150, a plan participant or sponsor is audibly provided with a series of choices in a menu. The plan participant or sponsor responds to the menu items using the keypad on the telephone 150. Illustrative remote operations which can be performed by plan participants using the telephone 150 include checking the current value of deferrals, trading units between funds in a Deferral Defined Contribution plan, requesting projections about the future value of investments and requesting historical information on plan performance over a period of time. Illustrative remote operations that can be performed by the plan sponsor using the telephone 150 are checking current asset values in an asset group, checking unit values for hypothetical funds linked to the assets in the corresponding asset group, determining the total liability of each hypothetical fund in the corresponding asset group and calculating if the values of the liabilities and assets are within the range specified by the benchmark.

Using the computer terminal 152 to correct to the fax/modem 8, the plan participant or sponsor likewise receives information from the computer system 2. The information is displayed on the monitor of the computer terminal 152 and data to be sent to the computer system 2 is input using the keyboard of the same computer terminal 52. Unlike the menu system of the telephone 150, the computer terminal 152 displays a series of prompts (i.e., menus, dialogue boxes, input screens) for the plan participant or sponsor instead of prompting using voice commands. Informational responses are sent from the computer terminal 152 to the computer system 2. The computer system 2 responds to requests by the plan participants or sponsor by sending a reply from the fax/modem 8 across the telephone wire, and the results are displayed on the monitor of the computer terminal 152. The computer terminal 152 can either be a stand-alone or networked computer, capable of general purpose computing but running software to connect to the computer system 2, or a "dumb" terminal, only capable of terminal interactions. In another embodiment where the terminal is a stand-alone or networked computer, prompts from the computer system are converted from text to speech by the computer terminal and voice recognition software converts voice responses of the plan participant or sponsor into text to be sent to the computer system 2.

Additional information to help calculate liabilities and assets may be received from remote terminals and information resource providers 154 (i.e., the U.S. Census Bureau and insurance/actuarial data providers) as in step 51. This information is used to update the database 13 and change the values used in steps 122, 126 and 130. Received information (i.e., economic indicators) is used in another embodiment to help plan sponsors predict the value of assets and liabilities in the future.

Obviously, numerous modifications and variations of the present invention are possible in light of the above teachings (i.e., types of assets are interchangeable between the Defined Contribution and Defined Benefit plans). It is therefore to be understood that within the scope of the appended claims, the invention may be practiced otherwise than as specifically described herein.

What is claimed as new and desired to be secured by Letters Patent of the United States is:

1. A computer system for managing a Non-Qualified Deferred Compensation (NQDC) plan on behalf of a plan sponsor, the NQDC plan being offered to a plan participant by the plan sponsor, the computer system comprising:

storage means for storing information about an asset group specified by the plan sponsor, the asset group comprising liabilities for investments made by the plan participant, assets held by the plan sponsor to cover the liabilities and a benchmark indicating an assigned correlation threshold between the assets and the liabilities;

first communication means for receiving updated values corresponding to the assets and liabilities;

computing means for computing an updated value of the assets and an updated value of the liabilities;

determining means for reading the benchmark from the storage means and determining if the updated value of the assets and the updated value of the liabilities are within the benchmark; and notification means for notifying the plan sponsor that there is an asset imbalance if the determining means determines that the updated value of the assets and the updated value of the liabilities are not within the benchmark.

2. The computer system of claim 1, further comprising:

second communication means for receiving requests from the plan participant and providing information to the plan participant on at least one of the updated value of the liability of the plan sponsor to the plan participant, a current allocation of investments made by the plan participant and a performance history of investments provided by the plan sponsor.

3. The computer system of claim 1, further comprising:

second communication means for receiving requests from the plan sponsor and providing information to the plan sponsor on at least one of the updated value of the liability of the plan sponsor to the plan participant, the updated value of the assets held by the plan sponsor and if the updated value of the assets and the updated value of liabilities of the asset group are within the benchmark.

4. The computer system of claim 1, further comprising:

second communication means for receiving requests from the plan participant to change an investment made by the plan participant.

5. The computer system of claim 4, further comprising:

third communication means for sending a confirmation of the investment change requested by the plan participant.

6. The computer system of claim 5, wherein the third communication means is a facsimile device.

7. The computer system of claim 1, wherein the first communication means is a modem which connects to at least one of a commercial information provider and an insurance company.

8. The computer system of claim 1, wherein the first communication means for receiving updated values corresponding to the assets comprises communication means for receiving at least one of a per unit stock price or a per unit mutual fund price.

9. The computer system of claim 1, wherein the first communication means for receiving updated values corresponding to the assets comprises communication means for receiving an annuity cash value.

10. The computer system of claim 1, wherein the first communication means for receiving updated values corresponding to the assets comprises communication means for receiving an insurance policy cash value.

11. The computer system of claim 1, wherein the first communication means for receiving updated values corresponding to the liabilities comprises communication means for receiving per unit values of hypothetical funds offered by the plan sponsor as part of the asset group.

12. The computer system of claim 1, wherein the first communication means for receiving updated values corresponding to the liabilities comprises communication means for receiving probabilities of at least one of retiring early, reaching retirement age, leaving a plan before early retirement and dying at each age before 65.

13. The computer system of claim 1, wherein the notification means is a facsimile device.

14. The computer system of claim 1, wherein the notification means is a modem which sends a notification to a remote plan sponsor computer terminal.

15. The computer system of claim 1, wherein the storage means is a computer database.

16. The computer system of claim 2, wherein the second communication means comprises an automated voice response unit.

17. The computer system of claim 3, wherein the second communication means comprises an automated voice response unit.

18. The computer system of claim 2, wherein the second communication means comprises:

a modem; and means for retrieving information corresponding to the received request from the storage means.

19. The computer system of claim 3, wherein the second communication means comprises:

a modem; and means for retrieving information corresponding to the received request from the storage means.

20. The computer system of claim 1, wherein the computing means computes assets and liabilities for a Defined Contribution plan.

21. The computer system of claim 1, wherein the computer means computes assets and liabilities for a Defined Benefit plan.

22. The computer system of claim 1, wherein the benchmark indicated an assigned correlation threshold between the assets and the liabilities is a percentage.

23. The computer system of claim 1, wherein the benchmark indicating an assigned correlation threshold between the assets and the liabilities is an absolute dollar amount.

24. The computer system of claim 1, further comprising:

second communication means for receiving census information used to estimate future assets and liabilities of an asset group.

25. A computer readable media containing code for controlling a computer to perform the steps of:

storing information about an asset group specified by a plan sponsor, the asset group comprising liabilities for investments made by a plan participant, assets held by the plan sponsor to cover the liabilities and a benchmark indicating an assigned correlation threshold between the assets and the liabilities;

receiving updated values corresponding to the assets and liabilities;

computing an updated value of the assets and an updated value of the liabilities;

reading the benchmark stored in the storing step;

determining if the updated value of the assets and the updated value of the liabilities are within the benchmark; and notifying the plan sponsor that there is an asset imbalance if the determining step determines that the updated value of the assets and the updated value of the liabilities are not within the benchmark.

\* \* \* \* \*